3,345,397
PREPARATION OF METHACRYLONITRILE
Joseph H. Finley, Edison, N.J., assignor to Petro-Tex Chemical Corporation, Houston, Tex., a corporation of Delaware
No Drawing. Filed Dec. 10, 1963, Ser. No. 329,359
3 Claims. (Cl. 260—465.3)

This invention relates to a process for producing aliphatic nitriles and relates more particularly to a vapor phase process for preparing unsaturated aliphatic nitriles from olefins.

I have found that unsaturated aliphatic nitriles, such as methacrylonitrile, may be prepared at excellent conversions and selectivity from olefins, as isobutylene, with ammonia and oxygen in the presence of a catalyst containing molybdenum, chromium, bismuth, and oxygen atoms.

Alpha-olefins containing from 3 to 6 carbon atoms may be ammoxidized in accordance with this invention. For example, such alpha-olefins as propylene, isobutylene, butene-1, 2 - methylbutene-3,2-methylbutene-1, hexenes, isohexenes, and the like. Alpha-olefins containing from 3 to 4 carbon atoms are preferred. Certain diolefins such as butadiene or mixtures of the above described alpha-olefins may be utilized. Isobutylene is a preferred reactant to make methacrylonitrile.

The catalyst employed in carrying out the process of this invention contains molybdenum, chromium, bismuth, and oxygen atoms, normally in the form of an intimate mixture of oxides of the metals, for example, an intimate mixture of molybdenum oxide, chromium oxide, and bismuth oxide. The metal oxides may be combined in ratios of from about 30 to 60 weight percent molybdenum oxide, about 30 to 60 percent chromium oxide, and 1 to 25 percent bismuth oxide. Larger amounts of bismuth oxide normally contribute to lower selectivity. Better results are normally obtained when the catalyst contains about 40 to 50 percent $MoO_3$, 40 to 50 percent $Cr_2O_3$, and 5 to 15 percent $Bi_2O_3$. The metal oxides may be in various oxidation states in the original catalyst, for example, molybdenum sesquioxide, molybdenum pentoxide, molybdenum trioxide, molybdenum dioxide, chromium oxide, chromium sesquioxide, chromium dioxide, bismuth trioxide, and the like.

The catalysts are prepared by methods known to those skilled in the art. For example, the catalyst actives may be deposited on catalyst supports from an aqueous slurry of the oxides or the support may be impregnated with salts in solution and then dried and heated in the presence of oxygen at elevated temperatures. Fluidized catalyst systems are advantageously used with this invention and good results obtained, for example, when catalyst actives consisting essentially of the oxides of molybdenum, chromium and bismuth are deposited on crushed Alundum pellets. The fluid bed catalysts may be prepared by mixing slurries or solutions of the catalyst actives in the presence of fluid supports such as activated alumina, and drying. These catalyst particles normally are less than 100 mesh and greater than 40 mesh standard U.S. screen size. The catalyst supports preferably have large pores. The average pore size of the carrier particles preferably are from about 0.1 micron to 20 microns. Carriers having pore sizes below 0.1 micron contribute to lower selectivity. The percent porosity should be between 15 and 60 percent. The surface area of the catalyst particles preferably is less than about 25 square meters per gram and more preferably is between about 1 and 10 square meters per gram. The amount of active catalyst components deposited on a carrier may be varied from an amount to essentially cover the surface of the carrier to amounts where the surface is completely covered with an excess. Excess actives deposited on a carrier are generally avoided to prevent loss of catalyst by attrition. Normally the carrier will contain from about 10 to 25 weight percent actives deposited thereon. Although a fluidized catalyst system is preferred, good results have been obtained with the catalyst in a fixed bed. For example, a mixture of about 45 percent $MoO_3$, 45 percent $Cr_2O_3$, and 10 percent $Bi_2O_3$ deposited on ⅛ inch Alundum particles having the required porosity and surface, diluted with inert particles gave good selectivity to methacrylonitrile.

Oxygen is added as elemental oxygen or with an inert diluent such as helium, nitrogen and the like. Air is a convenient source of oxygen. The concentration of air or oxygen in the reaction mixture may be varied depending, in part, on the choice of reaction conditions. Generally the oxygen to alpha-olefin mol ratio can be between about 8 mols to 0.5 or less mol of oxygen per mol of alpha-olefin, but more preferably are between about 4 mols to 1 mol of oxygen per mol of alpha-olefin. Molar ratios as high as 12 mols of oxygen per mol of alpha-olefin may be used but are not necessary. Generally, mol ratios of oxygen to hydrocarbon greater than 3 to 1 will be utilized only in lean streams, i.e., containing less than 20 percent olefin, because of the hazard of explosion. In addition, the use of excessively large amounts of oxygen is generally avoided particularly at relatively high temperatures since at these conditions the formation of combustion products and lower ammonia and olefin selectivities may result. If the oxygen ratio used is low, the rate of conversion, for example, of isobutylene to methacrylonitrile is reduced.

The ammonia to alpha-olefin mol ratio may be as low as 0.5 and as high as 15 mols of ammonia per mol of alpha-olefin. Usually the reaction will be conducted at ammonia to alpha-olefin mol ratios between about 0.5 to 9 mols of ammonia per mol of olefin and preferably between about 1 to 4 mols of ammonia per mol of alpha-olefin. An unexpected advantage of the process of this invention is that good selectivity to methacrylonitrile, based on the isobutylene, is obtained even when approximately equal concentrations of ammonia and isobutylene are employed. The ammonia may be introduced into the reaction mixture as either a liquid or gas. The ammonia may be added in a solvent such as water and preheated prior to admixing with the reactants.

In addition to oxygen and ammonia, inert diluents may be added to the reaction mixture. Materials which are substantially unreactive with the reactants or reaction products may be used as a diluent. Examples of suitable inert diluents that may be used are helium, nitrogen, methane, steam, and the like. Diluents such as steam and mixtures of steam and nitrogen have given excellent results. The amount of diluent utilized in this invention is varied from between 1.5 to 45 mols of steam per mol of alpha-olefin. Mol ratios from between about 4 to 10 mols of steam per mol of olefin are preferred.

The reaction is conducted at temperatures between about 300° C. to about 800° C. Good yields of unsaturated nitriles have been obtained at temperatures between about 450° C. and 600° C. The reaction temperature may be defined as the maximum temperature obtained in the reaction zone during the production of unsaturated nitriles. It is one of the advantages of this invention that higher conversions are achieved at lower temperatures than with prior art catalysts. The reaction may be conducted at superatmospheric or subatmospheric pressures and pressures of between 0.1 atmosphere and 10 atmospheres are generally preferred.

The flow rates of the reactants may be varied, with flow rates producing contact or residence times between about 0.01 second and 10 seconds being used. Preferably, residence or contact times between about 0.1 and 5 seconds are employed. Better results are obtained on contact times between 0.5 to 3 seconds. Residence time is the calculated time the reactants spend in the reaction zone at reaction temperature and pressure, assuming that the volume of feed and the volume of reaction product remain constant.

The alpha-olefins may be added to the reaction zone separately or as a mixture with either the ammonia or oxygen. Preferably a mixture of alpha-olefins and ammonia is heated separately from the oxygen and then introduced into the reaction zone. The diluent may be added to the reaction zone with the reactant mixture or heated separately therefrom.

In the following embodiment of the invention, percent conversion refers to the mols of alpha-olefin consumed per 100 mols of alpha-olefin fed into the reaction zone and percent selectivity represents the mols of unsaturated nitriles formed per 100 mols of alpha-olefin consumed.

In a typical run a fluid bed reactor of Vycor having a lower section 12 inches long and 30 mm. outside diameter and an upper section 8 inches long having an outside diameter of 38 mm. is used. The catalyst is supported on a porous porcelain disk and a 100 mesh stainless steel screen. The screen and disk are drilled to accommodate a ¼ inch Vycor thermowell placed in the center of the reactor. The reactor is heated with an electric oven. The lower 12 inches of the reactor is the preheat zone and the upper 8 inch catalyst area heated separately is the reaction zone. The gaseous stream of reactants is admitted in the bottom of the reactor. A catalyst was prepared by dissolving 48.4 grams of ammonium paramolybdate, 210.6 grams of chromic nitrate, and 20.8 grams of bismuth nitrate in 350 ml. of water containing 30 cc. concentrated nitric acid. 400 grams of Alundum particles having a mesh size of greater than 40 and less than 100 was stirred into this solution and the solution evaporated with stirring to deposit the mixture of catalyst actives onto the carrier. The coated carrier particles were then dried and heated at 200° C. for 72 hours to convert the salts to oxides. 18.4 percent actives were coated on the carrier. The Alundum particles had a surface area of 5 to 15 square meters per gram and a total porosity of 0.5 cc./gram as measured by water absorption. The pores in the particles varied in size from about 0.1 to 2.0 microns in diameter. 130 ml. of the dried catalyst was placed in the upper portion of the reactor tube. The reaction zone was heated to 475° C. A reaction mixture containing isobutylene, oxygen, ammonia, and steam was passed up through the catalyst in the fluid bed reactor at a rate of 186 ml./minute of isobutylene, 372 ml./minute of oxygen, 372 ml./minute of ammonia, and 1658 ml./minute of steam, all calculated at standard temperature and pressure. The isobutylene was converted to methacrylonitrile at a conversion of 76.7 percent and a selectivity of 75.3 percent representing a yield per pass of methacrylonitrile of about 57 percent. The selectivity to methacrylonitrile based on the ammonia was 59.9 percent. In another run, propylene was substituted for isobutylene and the ratio of reactants and other process conditions were held the same, except that the reaction was conducted at 550° C. and at a two second residence time. 47.8 percent of the propylene was converted at a selectivity of 71.8 percent to acrylonitrile.

I claim:
1. A process for preparing methacrylonitrile which comprises reacting isobutylene with oxygen and ammonia in molar ratios of 8 to 0.5 mol of oxygen per mol of isobutylene and 15 to 0.5 mol of ammonia per mol of isobutylene in a reaction zone at a temperature between about 450° C. to 600° C. in the presence of a catalyst consisting essentially of 30 to 60 percent molybdenum oxide, 30 to 60 percent chromium oxide, and 1 to 25 percent bismuth oxide.

2. A process for preparing methacrylonitrile which comprises reacting isobutylene with oxygen and ammonia in molar ratios of 3 to 1 mols of oxygen per mol of isobutylene and 4 to 1 mols of ammonia per mol of isobutylene in a reaction zone at a temperature between about 450° C. and 600° C. over a catalyst consisting essentially of about 40 to 50 percent molybdenum trioxide, about 40 to 50 percent chromium trioxide, and about 5 to 15 percent bismuth trioxide in the presence of steam, said catalyst being in particulate form on a carrier having a surface area between about 1 and 10 square meters per gram, a porosity between 15 and 60 percent, and the pores of said carrier being from above 0.1 to 20 microns in diameter.

3. A process for preparing methacrylonitrile which comprises reacting isobutylene with oxygen and ammonia in molar ratios of 1 mol of isobutylene with 1 to 4 mols of ammonia and 1 to 3 mols of oxygen over a fluidized catalyst consisting essentially of about 45 percent molybdenum trioxide, about 45 percent chromium trioxide, and about 10 percent bismuth trioxide deposited on a porous support, said support having a percent porosity between 15 and 60 percent and pores having an average diameter from above 0.1 to 20 microns, said catalyst particles being less than 100 mesh and larger than 40 mesh in size and the surface area of said catalyst particles being between about 1 to 10 square meters per gram.

References Cited
UNITED STATES PATENTS

| 3,009,943 | 11/1961 | Hadley et al. | 260—465.3 |
| 3,173,957 | 3/1965 | McDaniel et al. | 260—465.3 X |
| 3,226,421 | 12/1965 | Giordano et al. | 260—465.3 |
| 3,253,014 | 5/1966 | McDaniel et al. | 260—465.3 |

FOREIGN PATENTS

| 1,255,121 | 1/1961 | France. |

JOSEPH P. BRUST, *Primary Examiner.*